US008826350B1

(12) United States Patent
Maeng (10) Patent No.: US 8,826,350 B1
(45) Date of Patent: Sep. 2, 2014

(54) METHODS, DEVICES, AND MEDIUMS FOR PROVIDING GROUP VIDEO ON DEMAND

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 101 days.

(21) Appl. No.: 13/357,522

(22) Filed: Jan. 24, 2012

(51) Int. Cl.
*H04N 7/173* (2011.01)
(52) U.S. Cl.
USPC .................. 725/97; 725/86; 725/87; 725/101; 725/110; 715/753; 715/758
(58) Field of Classification Search
CPC ............ H04N 21/2358; H04N 21/236; H04N 21/23614; H04N 21/2668; H04N 21/2743; H04N 21/63; H04N 21/632; H04N 21/637; H04N 21/6377
USPC .............. 715/753, 758; 725/5, 86–87, 91, 97, 725/110, 114
See application file for complete search history.

(56) References Cited

U.S. PATENT DOCUMENTS

| | | | | |
|---|---|---|---|---|
| 5,694,163 A * | 12/1997 | Harrison | ................... | 725/110 |
| 6,081,830 A * | 6/2000 | Schindler | ................... | 709/204 |
| 6,754,904 B1 * | 6/2004 | Cooper et al. | ................... | 725/32 |
| 7,143,428 B1 * | 11/2006 | Bruck et al. | ................... | 725/37 |
| 7,221,387 B2 * | 5/2007 | Fernandez et al. | ......... | 348/14.08 |
| 7,246,367 B2 * | 7/2007 | Iivonen | ................... | 725/102 |
| 7,505,373 B2 * | 3/2009 | Paratte et al. | ................... | 368/157 |
| 7,603,683 B2 * | 10/2009 | Reto | ................... | 725/34 |
| 7,669,219 B2 * | 2/2010 | Scott, III | ................... | 725/89 |
| 7,679,637 B1 * | 3/2010 | Kohler | ................... | 348/14.01 |
| 7,707,246 B1 * | 4/2010 | Issa et al. | ................... | 709/204 |
| 8,013,938 B2 * | 9/2011 | Shyu | ................... | 348/565 |
| 8,307,395 B2 * | 11/2012 | Issa et al. | ................... | 725/46 |
| 8,312,500 B2 * | 11/2012 | Emerson et al. | ................... | 725/131 |
| 8,418,204 B2 * | 4/2013 | Pickelsimer et al. | ........... | 725/42 |
| 2003/0147386 A1 * | 8/2003 | Zhang et al. | ................... | 370/390 |
| 2003/0149988 A1 * | 8/2003 | Ellis et al. | ................... | 725/87 |
| 2004/0098754 A1 * | 5/2004 | Vella et al. | ................... | 725/135 |
| 2005/0028208 A1 * | 2/2005 | Ellis et al. | ................... | 725/58 |
| 2005/0132420 A1 * | 6/2005 | Howard et al. | ................... | 725/135 |
| 2005/0262542 A1 * | 11/2005 | DeWeese et al. | ................... | 725/106 |
| 2005/0283800 A1 * | 12/2005 | Ellis et al. | ................... | 725/40 |
| 2006/0179454 A1 * | 8/2006 | Shusman | ................... | 725/45 |
| 2006/0190966 A1 * | 8/2006 | McKissick et al. | ................... | 725/61 |
| 2007/0157249 A1 * | 7/2007 | Cordray et al. | ................... | 725/58 |
| 2008/0168506 A1 * | 7/2008 | Pickelsimer | ................... | 725/61 |
| 2009/0063994 A1 * | 3/2009 | Pickelsimer et al. | ......... | 715/753 |
| 2009/0113053 A1 * | 4/2009 | Van Wie et al. | ................... | 709/226 |
| 2009/0233542 A1 * | 9/2009 | Gratton et al. | ................... | 455/3.06 |
| 2010/0017474 A1 * | 1/2010 | Kandekar et al. | ................... | 709/205 |
| 2010/0037277 A1 * | 2/2010 | Flynn-Ripley et al. | ........ | 725/110 |
| 2010/0333127 A1 * | 12/2010 | Scott et al. | ................... | 725/24 |
| 2012/0110621 A1 * | 5/2012 | Gossweiler, III | ................... | 725/46 |
| 2012/0137316 A1 * | 5/2012 | Elizarov et al. | ................... | 725/9 |
| 2012/0174169 A1 * | 7/2012 | Nandiraju | ................... | 725/93 |

* cited by examiner

*Primary Examiner* — An Soon P Huynh
(74) *Attorney, Agent, or Firm* — Stolowitz Ford Cowger LLP (57) ABSTRACT

Method, medium and apparatus for receiving a request for a conferencing session identifying a group to participate in the conferencing session, the group comprising a first user terminal and a second user terminal, the request identifying media content to transmit to the group during the conferencing session, initiating the conferencing session including the group, in response to the request, receiving conferencing data comprising first communication data associated with the first user terminal and second communication data associated with the second user terminal, in response to the initiating the conferencing session, generating a first media stream and a second media stream, the first media stream comprising the media content and the second communication data and the second media stream comprising the media content and the first media stream and sending the first media stream to the first user terminal and the second media stream to the second user terminal.

37 Claims, 5 Drawing Sheets

METHODS, DEVICES, AND MEDIUMS FOR PROVIDING GROUP VIDEO ON DEMAND

BACKGROUND

A known system for providing Video on Demand (VoD) allows a user access to available video content at any time on demand. The video content is to be played out on a single user terminal over an Internet Protocol Television (IPTV) network, a cable television network, Internet, and/or satellite network. VoD service is not offered along with communication services.

DETAILED DESCRIPTION

Figure 1:
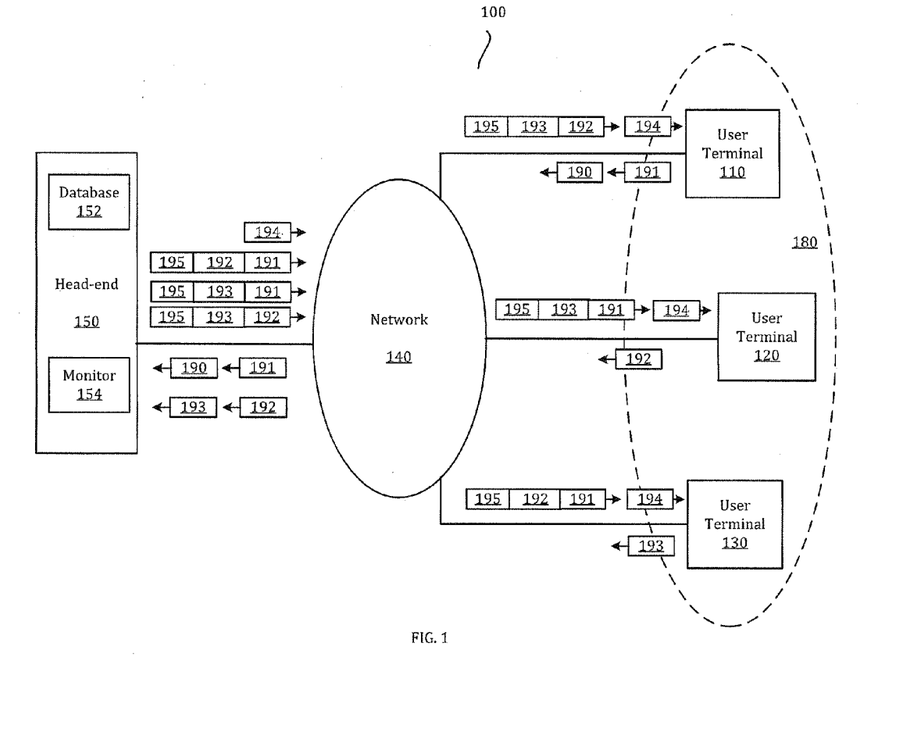
FIG. 1 depicts an example of a system for providing group Video on Demand.

FIG. 1 depicts an example of a system 100 for providing group Video on Demand (group VoD) service from a head-end 150 to a group 180 over a network 140. Group 180 may comprise any number of members. In an example, members of group 180 each may be associated with a user terminal, e.g., a user terminal 110, a user terminal 120 and/or a user terminal 130, or any combinations thereof, in a database 152. Head-end 150 may be configured to send media data 195 comprising video, audio and/or text data, and to send communication data, such as communication data 191, 192, and/or 193, comprising video, audio and/or text data to group 180.

In an example, head-end 150 may comprise one or more servers configured to distribute media data 195, and may comprise one or more communication servers configured to send and receive communication data. Head-end 150 may be associated with a group VoD service provider. Such a group VoD service provider may be a cable television service provider, an IPTV service provider, a mobile telephone service provider, a satellite TV service provider, or an Internet service provider, or the like, or any combinations thereof. Head-end 150 may be configured to manage functions to provide group VoD service to group 180. Group VoD service may include, for example, media data 195 distribution, email functions, communication management among members of group 180, program scheduling, and/or other functions associated with distribution of media and/or communication services, or any combinations thereof. Head-end 150 may be configured to manage group VoD subscription services to permit subscribers access to group VoD services. One or more members of group 180 may be a group VoD subscriber.

In an example, user terminals 110, 120 and/or 130 each may comprise a communication device configured to communicate over network 140 and to play out media data 195, such as, a television set, a computer, a mobile telephone, a laptop computer, a tablet, or the like, or any combinations thereof. Network 140 may be any network configured to provide communication services and media data 195 to user terminals 110, 120 and/or 130. For example, network 140 may comprise a cable television network, a satellite network, a mobile telephone network, the Internet, a Wide Area Network (WAN), a Local Area Network (LAN), or the like, or any combinations thereof.

In an example, user terminal 110 may communicate a request 190 for group VoD service for group 180 to head-end 150. Request 190 may be communicated via a variety of communication methods, such as, via a telephone communication, an email and/or an on-line registration form 300 (see FIG. 3). Request 190 may be configured to request transmission of media data 195 concurrent with communication data from head-end 150 to group 180. Request 190 may include information identifying members of group 180 and/or may provide group 180 member names and contact information and/or may identify user terminals associated with members of group 180, e.g., user terminals 110, 120 and/or 130.

In an example, request 190 may designate an authorization level for one or more members of group 180. Such an authorization level may permit and/or prevent use of various group VoD service features. Request 190 may designate a start and/or stop time for group VoD service, may provide billing information and/or may identify communication services to be accessible during a group VoD session. Request 190 may include other information associated with group VoD service and claimed subject matter is not limited in this regard.

In an example, in response to request 190, head-end 150 may be configured to initiate a group VoD session and may generate and/or send a notification 194 via any known communication method to members of group 180, e.g., email, instant messaging, telephone call and/or text message, or the like, or any combinations thereof. Members of group 180 may receive notification 194 at respective user terminals 110, 120 and/or 130, or any combinations thereof. Notification 194 may include group VoD service data to be used to join the group VoD session. In another example, notification 194 may include group VoD service data to be used to initiate a group VoD session.

In an example, in response to request 190, head-end 150 may receive communication data 191, 192 and/or 193 from respective user terminals 110, 120 and/or 130, or any combinations thereof. Communication data 191, 192 and/or 193 may include group VoD service data provided in notification 194 to join and/or initiate a group VoD session. In another example, user terminals 110, 120 and/or 130 may join or initiate a group VoD session without providing group VoD service data from notification 194.

In an example, head-end 150 may combine, e.g., by multiplexing, media data 195 with various combinations of communication data 191, 192 and/or 193 to send to user terminals 110, 120 and/or 130 during a group VoD session. For example, head-end 150 may multiplex media data 195 with communication data 192 and 193 to send to user terminal 110. User terminal 110 may de-multiplex media data 195 and communication data 192 and 193. User terminal 110 also may play out media data 195 with communication data 192 and 193. Similarly, head-end 150 may multiplex media data 195 with communication data 191 and 193 to send to user terminal 120. User terminal 120 may de-multiplex media data 195 and communication data 191 and 193. User terminal 120 also may play out media data 195 with communication data 191 and 193. Likewise, head-end 150 may multiplex media data 195 with communication data 191 and 192 to send to user terminal 130. User terminal 130 may de-multiplex media data 195 and communication data 191 and 192. User terminal 130 also may play out media data 195 with communication data 191 and 192.

In an example, head-end 150 may store communication data 191, 192 and/or 103 and/or corresponding media data 195 in database 152 or a different database. Claimed subject matter is not limited in this regard. A monitor 154 may be configured to monitor communication data 191, 192 and/or 193 and media data 195. Head-end 150 may generate statistical data based on monitored activity associated with media data 195, user terminals 110, 120 and/or 130 and/or members of group 180. Such statistical data may have a variety of uses, such as, to target advertising and/or to determine quality of service.

In an example, after media data 195 has played out, head-end 150 may permit communication between members of group 180 to continue for a period of time thereafter, for example, to conduct a postmortem of a lively sporting event and/or to continue a discussion related to media data 195. Such a period of time may be predetermined, may be arbitrary, or may be based on when members of group 180 discontinue sending communication data to head-end 150.

Figure 2:
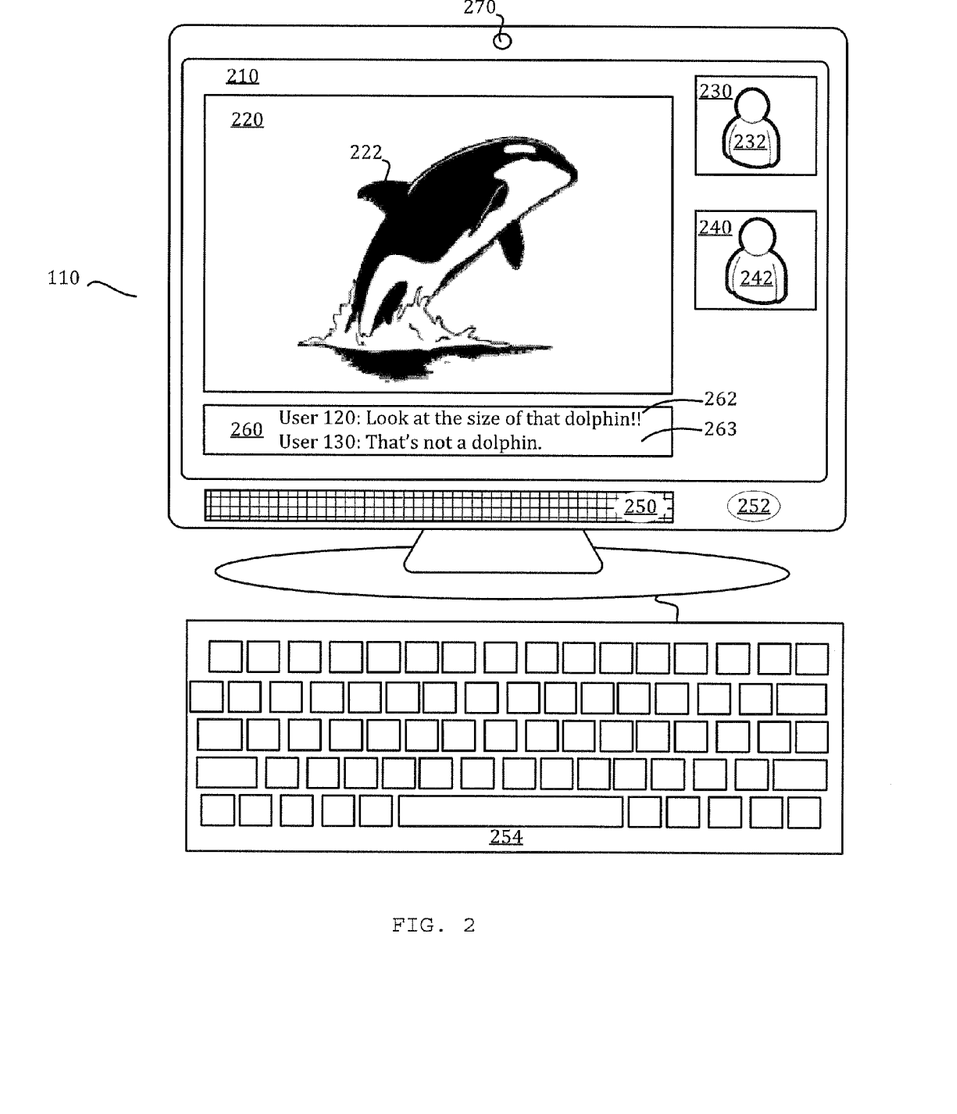
FIG. 2 depicts an example of an apparatus for providing group Video on Demand.

FIG. 2 depicts an example of user terminal 110 (FIG. 1) configured to provide group VoD service. In an example, user terminal 110 may be a communications device, such as a television set, a computer, a mobile telephone, a laptop computer, a tablet, or the like, or any combinations thereof.

In an example, user terminal 110 may comprise a display 210 configured to display video content 222 associated with media data 195 in a window 220 concurrent with playing out communication data 192 and/or 193. Video content 222 may comprise a dedicated program, e.g., a movie, a television show, a news program and/or a sporting event, a video game, a live performance, a real-time broadcasting program, e.g., a live sporting event, a live video feed, an advertisement, or the like, or any combinations thereof. Audio data associated with media data 195 may be played by a speaker 250. In an example, media data 195 may be exclusively provided to group 180 by head-end 150.

In an example, user terminal 110 may display video content 232 associated with communication data 192 in a window 230 concurrent with playing out media data 195 and/or communication data 193. Video content 232 may comprise a live video stream, a still picture, a graphical image, or the like, or any combinations thereof. In an example, video content 232 may be a user image. Audio content associated with communication data 192 may be played by speaker 250. In an example, communication data 192 may comprise text data 262, e.g., text messages and/or email, which may be displayed in a window 260 concurrent with playing out media data 195 and/or communication data 193. A group 180 member name associated with text data 262 may be displayed along with text data 262.

In an example, user terminal 110 may display video content 242 associated with communication data 193 in a window 240 concurrent with playing out media data 195 and/or communication data 192. Video content 242 may comprise a live video stream, a still picture, a graphical image, or the like, or any combinations thereof. In an example, video content 242 may be a user image. Audio content associated with communication data 193 may be played by speaker 250. In an example, communication data 193 may comprise text data 263, e.g., text messages and/or email, which may be displayed in window 260 concurrent with playing out media data 195 and/or communication data 192. A group 180 member name associated with text data 263 may also be displayed along with text data 263.

In an example, user terminal 110 may include a microphone 252 configured to receive audio data, a keyboard 254 configured to receive user input data, such as text data, and/or a camera 270 configured to capture video data. Audio data, user input data and/or video data may be transmitted to other members of group 180 via communication data 191.

Figure 3:
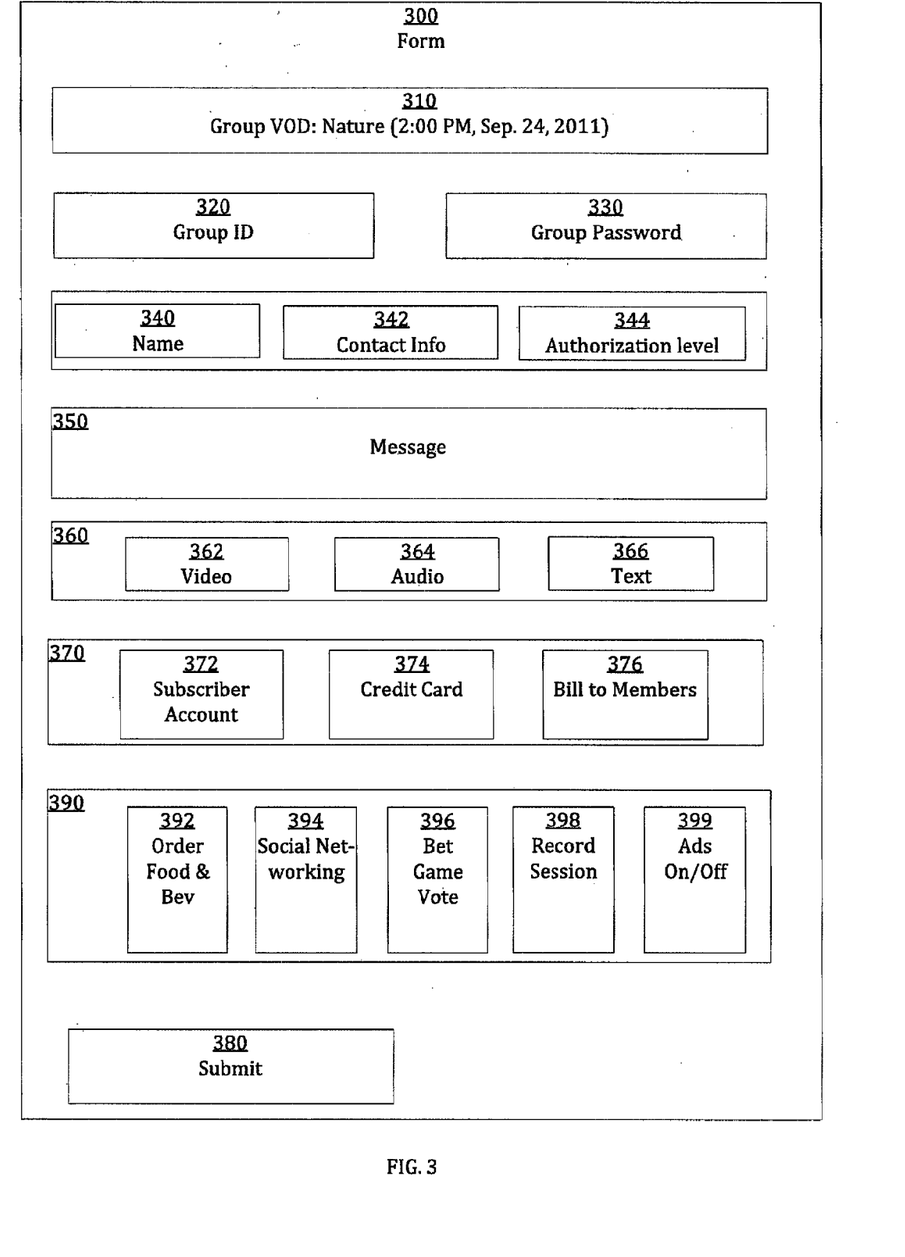
FIG. 3 depicts an example of a form for requesting group Video on Demand.

FIG. 3 depicts an example of form 300 configured to be used to generate request 190 (FIG. 1). In an example, form 300 may be an on-line form accessible via a web portal and/or may be accessible from user terminal 110 via any network, such as, a cable television network, a satellite network, an IPTV network, a mobile telephone network, the Internet, a Wide Area Network (WAN), a Local Area Network (LAN), or the like, or any combinations thereof. In another example, form 300 may be accessible from a programming guide associated with head-end 150.

In an example, form 300 may be configured to prompt user data inputs for processing and/or generating request 190. A selected program name 310 may be identified in form 300. A user may be prompted to input, select and/or assign a group ID 320 and/or a group password 330. A user may be prompted to enter data about each member of group 180, such as, a member name 340, member contact information 342, e.g., an email address and/or a telephone number, and/or a member authorization level 344. A user may compose a message 350 to be sent to members of group 180 with notification 194. A user may select a communication type 360 to be used for communication among members of group 180 during a group VoD session, e.g., video 362, audio 364 and/or text 366, or any combinations thereof. A user may be prompted to enter billing information in a box 370 including, for example, identifying a subscriber account 372, credit card information 374 and/or identifying one or more members of group 180 to bill separately for group VoD service.

In an example, additional services 390 may be available from and/or through head-end 150. A user may be prompted to select additional services 390 for one or more members of group 180. For example, a user may place a food or beverage order 392. Such an order may be placed within form 300 and may be communicated to a local purveyor via network 140. A user may request social networking services 394, such as, access to social networking alerts and/or an ability to update a user's social networking profile in association with the group VoD service. Head-end 150 may provide betting/gaming/voting services 396. For example, head-end 150 may track sports betting, may permit members of group 180 to play games associated with particular programs and/or may track voting among members of group 180, e.g., to determine popularity of contestants in a reality program. A user may be prompted to request a recording 398 of a corresponding group VoD session. Such a recording may include communications among members of group 180 via user terminals 110, 120 and/or 130 and/or post group VoD session communications, such as a postmortem after selected program 310 has finished playing. A user may be prompted to turn advertisements on or off. In an example, a fee may be associated with turning advertisements off. Other additional services may be associated with group VoD service and claimed subject matter is not limited in this regard.

In an example, information entered into form 300 may be communicated to head-end 150 in request 190 by selecting a submit button 380 and/or any other method known to those of skill in the art. In another example, information entered in form 300 may be communicated to head-end 150 separately from request 190.

In an example, database 152 may store group ID 320 and/or password 330 in association with member name 340 and/or contact information 342. Members of group 180 may or may not be group VoD service provider subscribers. Each member name 340 may be associated with a corresponding authorization level 344 in database 152.

In an example, head-end 150 may send notification 194 via email, instant message and/or text message, or the like, or any combinations thereof to members of group 180. Notification 194 may comprise an invitation to join a group VoD session and/or instructions for joining and/or initiating a group VoD session. The instructions may include a website URL to access the group VoD session, group ID 320, group password 330, message 350 and/or other administrative information such as a start/stop time, a listing identifying members of group 180 and/or an authorization level 344. Members of group 180 may access the group VoD session by following the instructions provided in notification 194.

Figure 4:
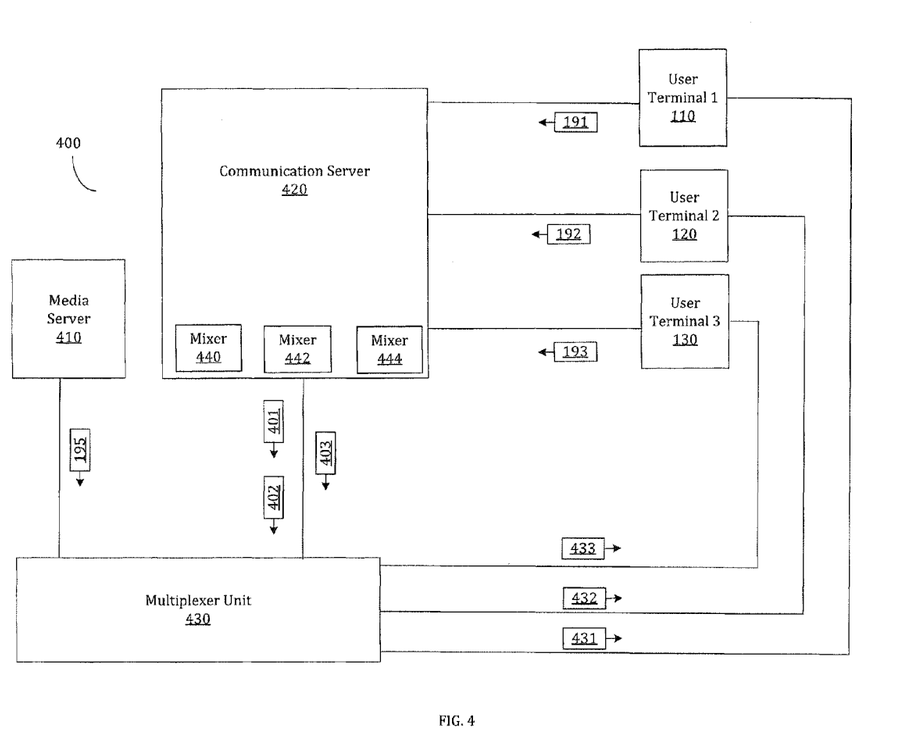
FIG. 4 depicts yet another example of a system for providing group Video on Demand.

FIG. 4 depicts an example of a block diagram of a system 400 for providing group VoD services. In an example, system 400 comprises a media server 410, a communication server 420, mixers 440, 442 and 444 and a multiplexer unit 430. Media server 410, communication server 420, mixers 440, 442 and 444 and multiplexer unit 430 may be co-located at head-end 150 and or may be located separately.

In an example, media server 410 may comprise an Operating Support System (OSS) and may store and/or distribute media data 195. Communication server 420 may receive communication data 191 from user terminal 110, communication data 192 from user terminal 120 and/or communication data 193 from user terminal 130. Communication server 420 may include mixers 440, 442 and/or 444. In another example, communication server 420 may be separate from mixers 440, 442 and/or 444. In yet another example, communication server 420 may include one or more of mixers 440, 442 and/or 444 and/or additional mixers. Claimed subject matter is not limited in this regard.

In an example, mixers 440, 442 and/or 444 each may be configured to mix communication data. For example, mixer 440 may mix communication data 192 and communication data 193 to generate mixed communication data 401. Mixer 442 may mix communication data 191 and communication data 193 to generate mixed communication data 402. Mixer 444 may mix communication data 191 and communication data 192 to generate mixed communication data 403.

In an example, multiplexer unit 430 may comprise one or more multiplexers. Multiplexer unit 430 may be co-located with communication server 420 or may be located separate from communication server 420. Multiplexer unit 430 may be configured to combine mixed communication data 401 with media data 195 to generate group VoD data 431, to combine mixed communication data 402 with media data 195 to generate group VoD data 432 and/or to combine mixed communication data 403 with media data 195 to generate group VoD data 433. Multiplexer unit 430 may send group VoD data 431 to user terminal 110, may send group VoD data 432 to user terminal 120 and/or may send group VoD data 433 to user terminal 130.

In an example, user terminal 110 may receive and de-multiplex group VoD data 431 and display and/or play video, audio, and/or text data from group VoD data 431. User terminal 120 may receive and de-multiplex group VoD data 432 and display and/or play video, audio, and/or text data from group VoD data 432. User terminal 130 may receive and de-multiplex group VoD data 433 and display and/or play video, audio, and/or text data from group VoD data 433.

Figure 5:
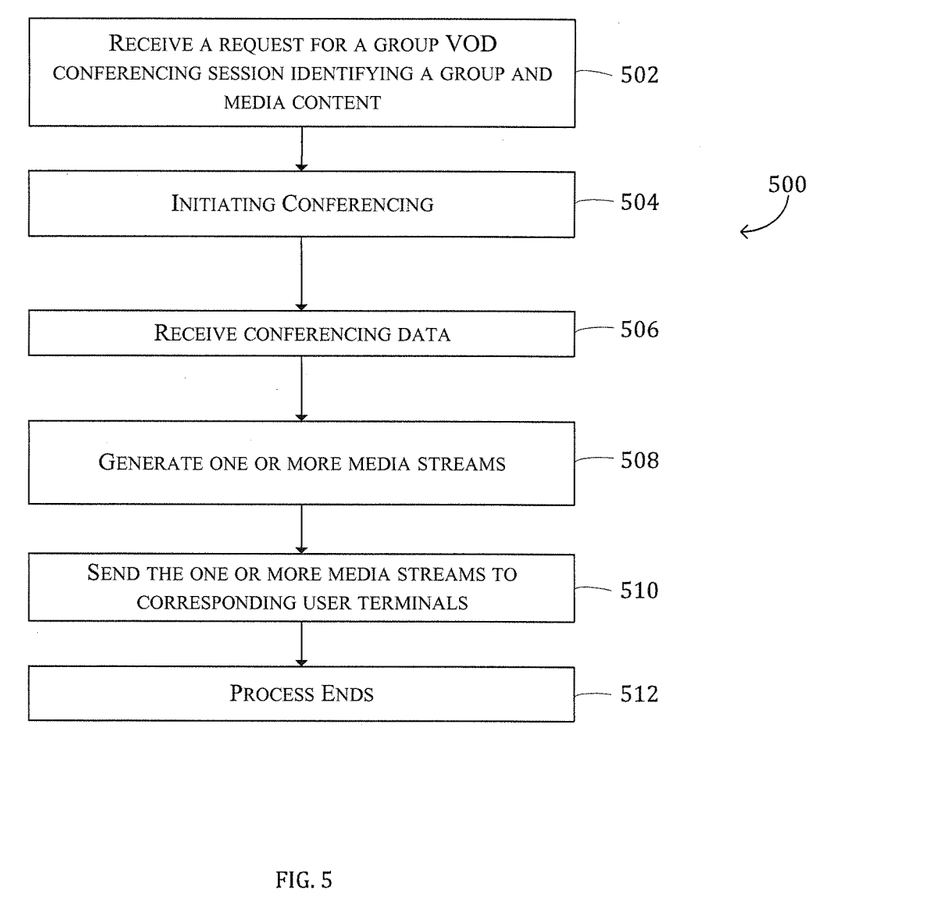
FIG. 5 depicts an example of a process for providing group Video on Demand.

FIG. 5 depicts an example of a process 500 for providing group VoD services to a group 180. In an example, process 500 begins at operation 502 where a head-end 150 (see FIG. 1) receives a request for a group VoD conferencing session from a user terminal 110. In an example, request 190 identifies a group 180 to participate in the group VoD conferencing session. Group 180 may comprise any number of participants. Request 190 may identify media data 195 to transmit to group 180 during the group VoD conferencing session.

In an example, in operation 504, head-end 150 may send notification 194 to one or more members of group 180 identified in request 190. Notification 194 may be received by user terminals 110, 120 and/or 130. As discussed above, notification 194 may include information about how to join and/or initiate the group VoD conferencing session as well as other administrative details corresponding to the group VoD conferencing session. In operation 506, in response to request 190, head-end 150 may receive conferencing data comprising communication data 191, communication data 192 and/or communication data 193. In an example, communication data 191, communication data 192 and/or communication data 193 each may include data for joining and/or initiating the group VoD conferencing session. Communication data 191, communication data 192 and/or communication data 193 may identify respective user terminals 110, 120 and/or 130.

In an example, in operation 508, head-end 150 may generate a first media stream comprising media data 195 and communication data 191 and a second media stream comprising media data 195 and communication data 192. In another example, head-end 150 may generate a different first media stream comprising media data 195 and communication data 191 and 192, a different second media stream comprising media data 195 and communication data 192 and 193 and a third media stream comprising media data 195 and communication data 191 and 193.

In an example, in operation 510, head-end 150 may send the first media stream to user terminal 120 and the second media stream to user terminal 110. In another example, head-end 150 may send the different first media stream to user terminal 130, the different second media stream to user terminal 110 and the third media stream to user terminal 120. At operation 512 the process may end.

The system and apparatus described above may use dedicated processor systems, micro controllers, programmable logic devices, microprocessors, or the like, or any combinations thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via lineless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or the like, or any combinations thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of examples, it should be apparent that the examples may be modified in arrangement and detail without departing from such principles. We claim all modifications and variation coming within the spirit and scope of the following claims.

The invention claimed is:

1. A method comprising:
   receiving, at a processing device operating in a head-end, a request for a group Video On Demand (VOD) conferencing session from a first user terminal identifying media content for broadcasting to a group of user terminals during the group VOD conferencing session, and wherein the request for a group VOD conferencing session identifies contact information for the first user terminal, a second user terminal, and a third user terminal;
   sending, by the processing device, a notification to the first user terminal, the second user terminal, and the third user terminal in response to the request for a group VOD conferencing session;
   receiving, by the processing device, conferencing data comprising first communication data from the first user terminal, second communication data from the second user terminal, and third communication data from the third user terminal in response to the notification;
   initiating, by the processing device, the group VOD conferencing session in response to the request for a group VOD conferencing session, wherein initiating the group of VOD conferencing session comprises starting playing of the media content and generating a first media stream, a second media stream, and a third media stream, wherein:
   the first media stream comprises the media content, the second communication data, the third communication data, and the first media stream does not comprise the first communication data,
   the second media stream comprises the media content, the first communication data, the third communication data, and the second media stream does not comprise the second communication data, and
   the third media stream comprises the media content, the first communication data, the second communication data, and the third media stream does not comprise the third communication data; and
   concurrently sending, by the processing device, the first media stream to the first user terminal, the second media stream to the second user terminal, and the third media stream to the third user terminal.

2. The method of claim 1, wherein the media content comprises an on-demand television broadcast.

3. The method of claim 1, wherein the generating, further comprises:
   mixing, by the processing device, the second communication data and the third communication data to generate first mixed communication data;
   mixing, by the processing device, the first communication data and the third communication data to generate second mixed communication data; and
   mixing, by the processing device, the first communication data and the second communication data to generate third mixed communication data.

4. The method of claim 3, wherein the generating further comprises:
   multiplexing, by the processing device, the media content and the first mixed communication data to generate the first media stream;
   multiplexing, by the processing device, the media content and the second mixed communication data to generate the second media stream; and
   multiplexing, by the processing device, the media content and the third mixed communication data to generate the third media stream.

5. The method of claim 1, further comprising:
   receiving a start and stop time from the first user terminal;
   starting the playing of the media content data to the first user terminal, the second user terminal, and the third user terminal based on the start time; and
   terminating the playing of the media content to the first user terminal, the second user terminal, and the third user terminal based on the stop time.

6. The method of claim 5, further comprising:
   continuing sending, by the processing device, the first communication data and the third communication data to the second user terminal, the second communication data and the third communication data to the first user terminal: and the first communication data and the second communication data to the third user terminal after the stop time.

7. The method of claim 1, further comprising, monitoring, by the processing device, the first media stream, the second media stream, and the third media stream to generate statistical data associated with at least one of the media content, the first user terminal, the second user terminal, or the third user terminal.

8. The method of claim 1, further comprising, storing a programming menu comprising a conferencing data structure including a first user terminal identifier, a second user terminal identifier, and a third user terminal identifier: wherein the conferencing data structure is accessible by at least one of the first user terminal, the second user terminal, or the third user terminal.

9. The method of claim 1, wherein the request for a group VOD conferencing session further comprises selectively turning on and turning off sending of advertisements with the media content.

10. A computer-readable memory device having instructions stored thereon that, in response to execution by a processing device operating at a head-end, cause the processing device to perform operations comprising:
receiving a request, by the processing device, for a group Video On Demand (VOD) conferencing session identifying a group to participate in the group Video On Demand (VOD) conferencing session, wherein the request identifies a first user terminal, a second user terminal, and a third user terminal of the group, and the request identifies media content to transmit to the group during the group Video On Demand (VOD) conferencing session;
sending, by the processing device, a notification to the first user terminal, the second user terminal, and the third user terminal in response to the request;
receiving, by the processing device, conferencing data comprising first communication data from the first user terminal, second communication data from the second user terminal, and third communication data from the third user terminal in response to the notification;
initiating, by the processing device, the group Video On Demand (VOD) conferencing session, wherein initiating the conferencing session comprises starting playing the media content in response to the request;
generating, by the processing device, a first media stream, a second media stream, and a third media stream wherein:
the first media stream comprises the media content, the second communication data, the third communication data, and the first media stream does not comprise the first communication data,
the second media stream comprises the media content, the first communication data, the third communication data, and the second media stream does not comprise the second communication data, and
the third media stream comprises the media content, the first communication data, the second communication data, and the third media stream does not comprise the third communication data; and
concurrently sending the first media stream to the first user terminal, the second media stream to the second user terminal, and the third media stream to the third user terminal.

11. The computer-readable memory device of claim 10, wherein the media content comprises a group Video On Demand (VOD) television broadcast.

12. The computer-readable memory device of claim 10, wherein the operations further comprise:
mixing the second communication data and the third communication data to generate first mixed communication data;
mixing the first communication data and the third communication data to generate second mixed communication data; and
mixing the first communication data and the second communication data to generate third mixed communication data.

13. The computer-readable memory device of claim 12, wherein the operations further comprise:
multiplexing the media content and the first mixed communication data to generate the first media stream;
multiplexing the media content and the second mixed communication data to generate the second media stream; and
multiplexing the media content and the third mixed communication data to generate the third media stream.

14. The computer-readable memory device of claim 10, wherein the operations further comprise, storing the first media stream, the second media stream, and the third media stream.

15. The computer-readable memory device of claim 14, wherein the operations further comprise, monitoring the first media stream, the second media stream, and the third media stream to generate statistical data associated with at least one of the media content, the first user terminal, the second user terminal, or the third user terminal.

16. The computer-readable memory device of claim 10, wherein the operations further comprise:
receiving a start and stop time from the first user terminal;
starting the playing of the media content and the conferencing data to the first user terminal, the second user terminal, and the third user terminal based the start time; and
terminating the playing of the media content to the first user terminal, the second user terminal, and the third user terminal based on the stop time.

17. The computer-readable memory device of claim 10, wherein the conferencing data includes at least one of real-time video data, real-time audio data, or user input data.

18. The computer-readable memory device of claim 10, wherein the operations further comprise, storing a programming menu comprising a conferencing data structure including a first user terminal identifier, a second user terminal identifier, and a third user terminal identifier, wherein the conferencing data structure is accessible by at least one of the first user terminal, the second user terminal, or the third user terminal.

19. The computer-readable memory device of claim 10, wherein the request further comprises selectively identifying which of the first user terminal, second user terminal, and/or third user terminal to bill for the group Video On Demand (VOD) conferencing session.

20. An apparatus implemented at a communication server, the apparatus comprising:
a memory device that stores instructions associated with an application program; and
a processing device that, in response to executing the instructions stored in the memory device, performs:
receiving a request for a group Video On Demand (VOD) conferencing session identifying a group to participate in the group Video On Demand (VOD) conferencing session, wherein the request identifies contact information for a first user terminal, a second user terminal, and a third user terminal for the group, and wherein the request identifies media content to transmit to the group during the group Video On Demand (VOD) conferencing session;
sending a notification to the first user terminal, the second user terminal, and the third user terminal in response to the request;
initiating the group Video On Demand (VOD) conferencing session for the group, and starting playing of the media after receiving responses to the notification;

receiving conferencing data comprising first communication data from the first user terminal, second communication data from the second user terminal, and third communication data from the third user terminal in response to the initiating of the group Video On Demand (VOD) conferencing session;

generating a first media stream, a second media stream, and a third media stream, wherein:

the first media stream comprises the media content, the second communication data and the third communication data, and does not comprise the first communication data, the second media stream comprises the media content, the first communication data and the third communication data, and does not comprise the second communication data, the third media stream comprises the media content, the first communication data and the second communication data, and does not comprise the third communication data; and concurrently sending the first media stream to the first user terminal, the second media stream to the second user terminal, and the third media stream to the third user terminal.

21. The apparatus of claim 20, wherein the media content comprises a group Video On Demand (VOD) television transmission.

22. The apparatus of claim 20, wherein the processing device further performs:

mixing the second communication data and the third communication data to generate first mixed communication data;

mixing the first communication data and the third communication data to generate second mixed communication data; and mixing the first communication data and the second communication data to generate third mixed communication data.

23. The apparatus of claim 22, wherein the processing device performs:

multiplexing the media content and the first mixed communication data to generate the first media stream;

multiplexing the media content and the second mixed communication data to generate the second media stream; and multiplexing the media content and the third mixed communication data to generate the third media stream.

24. The apparatus of claim 20, wherein the processing device further performs storing the first media stream, the second media stream, and the third media stream.

25. The apparatus of claim 24, wherein the processing device further performs monitoring the first media stream, the second media stream, and the third media stream to generate statistical data associated with at least one of the media content, the first user terminal, the second user terminal, or the third user terminal.

26. The apparatus of claim 20, wherein the processing device further performs:

terminating the sending of the first media stream to the first user terminal, the sending of the second media stream to the second user terminal, and the sending of the third media stream to the third terminal; and sending the first communication data and the third communication data to the second user terminal, the second communication data and the third communication data to the first user terminal, and the first communication data and the second communication data to the third user terminal subsequent to the terminating.

27. The apparatus of claim 20, wherein the conferencing data includes at least one of real-time video data, real-time audio data, or user input data.

28. The apparatus of claim 20, wherein the processing device further performs, storing a programming menu comprising a conferencing data structure including a first user terminal identifier, a second user terminal identifier, and a third user terminal identifier, wherein the conferencing data structure is accessible by at least one of the first user terminal, the second user terminal, or the third user terminal.

29. The apparatus of claim 20, wherein the request further comprises payment authorization.

30. A method comprising:

sending, by a first network user terminal, a request for a group Video On Demand (VOD) conferencing session to a communication server, wherein the request for a group Video On Demand (VOD) conferencing session identifies the first network user terminal, a second network user terminal, and a third network user terminal, and the request identifies media content comprising a group Video On Demand (VOD) television broadcast to transmit to the first network user terminal, the second network user terminal, and the third network user terminal during the group VOD conferencing session;

receiving, by the first network user terminal, an invitation from the communication server to join the group VOD conferencing session concurrently with the second network user terminal and the third network user terminal receiving the invitation, in response to the request;

sending, by the first network user terminal, first conferencing data, in response to the invitation; and receiving, by the first network user terminal, a first media stream from the communication server concurrently with the second network user terminal receiving a second media stream and the third network user terminal receiving a third media stream, wherein the first media stream comprises the media content multiplexed with second conferencing data originating from the second network user terminal and third conferencing data originating from the third network user terminal, and the first media stream does not comprise the first conferencing data;

wherein the second media stream comprises the media content multiplexed with the first conferencing data and the third conferencing data, and the second media stream does not comprise the second conferencing data; and wherein the third media stream comprises the media content multiplexed with the first conferencing data and the second conferencing data, and the third media stream does not comprise the third conferencing data.

31. The method of claim 30, further comprising, playing out, by the first network user terminal, the media content, the second conferencing data, and the third conferencing data.

32. The method of claim 31, further comprising controlling, by the first network user terminal, the playing out of the media content separately from the playing out of the second and third conferencing data.

33. The method of claim 30, further comprising, storing, by the first network user terminal, the media content, the second conferencing data, and the third conferencing data.

34. The method of claim 30, further comprising:

sending, by the first network user terminal, a stop time to the communication server configured to terminate playing of the media content based on the stop time; and receiving, by the first network user terminal, the second conferencing data and the third conferencing data after the stop time and terminating the playing of the media content.

35. The method of claim 30, wherein the first conferencing data, the second conferencing data, and the third conferencing data include at least one of real-time video data, real-time audio data, or user input data.

36. The method of claim 30, further comprising selecting, by the first network user terminal, the second network user terminal and the third network user terminal from a list of available network user terminals in a programming menu.

37. The method of claim 30, wherein the request further comprises a payment authorization associated with the media content.

* * * * *